United States Patent
Gowda et al.

(10) Patent No.: US 11,176,324 B2
(45) Date of Patent: Nov. 16, 2021

(54) CREATING LINE ITEM INFORMATION FROM FREE-FORM TABULAR DATA

(71) Applicant: SAP SE, Walldorf (DE)

(72) Inventors: Kumaraswamy Gowda, Bangalore (IN); Nithya Rajagopalan, Bangalore (IN); Nishant Kumar, Bangalore (IN); Panish Ramakrishna, Bangalore (IN); Rajendra Vuppala, Dublin, CA (US); Erica Vandenhoek, Palo Alto, CA (US)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 16/584,420

(22) Filed: Sep. 26, 2019

(65) Prior Publication Data
US 2021/0097139 A1    Apr. 1, 2021

(51) Int. Cl.
*G06F 40/295*    (2020.01)
*G06F 40/177*    (2020.01)
*G06F 40/49*    (2020.01)
*G06K 9/62*    (2006.01)

(52) U.S. Cl.
CPC .......... *G06F 40/295* (2020.01); *G06F 40/177* (2020.01); *G06F 40/49* (2020.01); *G06K 9/6278* (2013.01)

(58) Field of Classification Search
CPC ...... G06F 40/295; G06F 40/49; G06F 40/177; G06K 9/6278
See application file for complete search history.

(56) References Cited

U.S. PATENT DOCUMENTS

| | | | | |
|---|---|---|---|---|
| 2005/0102303 | A1* | 5/2005 | Russell | G06F 16/211 |
| 2007/0100862 | A1* | 5/2007 | Reddy | G06F 16/2477 |
| 2010/0070448 | A1* | 3/2010 | Omoigui | H01L 27/14647 706/47 |
| 2010/0239154 | A1* | 9/2010 | Fujimori | G06K 9/4614 382/141 |
| 2011/0202517 | A1* | 8/2011 | Reddy | G06F 16/951 707/706 |
| 2012/0191716 | A1* | 7/2012 | Omoigui | H01L 27/14647 707/740 |

(Continued)

OTHER PUBLICATIONS

Extended European Search Report issued in European Application No. 20197491.2 dated Dec. 3, 2020, 11 pages.

*Primary Examiner* — Michael N Opsasnick
(74) *Attorney, Agent, or Firm* — Fish & Richardson P.C.

(57) ABSTRACT

The present disclosure involves systems, software, and computer implemented methods for creating line item information from tabular data. One example method includes receiving event data values at a system. Column headers of columns in the event data values are identified. At least one column header is not included in standard line item terms used by the system. Column values of the columns in the event data values are identified. The identified column headers and the identified column values are processed using one or more models to map each column to a standard line item term used by the system. The processing includes using context determination and content recognition to identify standard line item terms. An event is created in the system, including the creation of line items from the identified column value. Each line item includes standard line item terms mapped to the columns.

20 Claims, 5 Drawing Sheets

(56) References Cited

U.S. PATENT DOCUMENTS

| | | | |
|---|---|---|---|
| 2012/0215523 A1* | 8/2012 | Inagaki | G06F 16/35 704/9 |
| 2012/0290557 A1* | 11/2012 | Reddy | G06F 16/2477 707/711 |
| 2014/0201126 A1* | 7/2014 | Zadeh | A61B 5/165 706/52 |
| 2014/0344718 A1* | 11/2014 | Rapaport | H04L 51/32 715/753 |
| 2016/0092475 A1* | 3/2016 | Stojanovic | G06F 16/2379 707/805 |
| 2018/0173772 A1 | 6/2018 | Anatha et al. | |
| 2018/0322185 A1 | 11/2018 | Patel et al. | |
| 2019/0132130 A1 | 5/2019 | Anatha et al. | |
| 2019/0179937 A1 | 6/2019 | Banerjee et al. | |

* cited by examiner

| Item | Code | Estimated Lead | Factory | Nbr | Cost | Historic Price | Remarks |
|---|---|---|---|---|---|---|---|
| Cabinets | 1222459 | 3 days | Chicago | 12 | $300 | $320 | 12 of Maple |

400
402
404 Item
406 Code
408 Estimated Lead
410 Factory
412 Nbr
414 Cost
416 Historic Price
418 Remarks
422
420 1222459
xxx
424
426
428
xxx

FIG. 4B

Results for estimated_lead

| Candidate Term | Score |
|---|---|
| lead_time | 0.7672 |
| baseline | 0.6242 |
| seconds | 0.6121 |
| surpassing | 0.5633 |
| scheduled_close | 0.4432 |

CREATING LINE ITEM INFORMATION FROM FREE-FORM TABULAR DATA

TECHNICAL FIELD

The present disclosure relates to computer-implemented methods, software, and systems for creating line item information from tabular data.

BACKGROUND

Strategic sourcing can be performed by a company to monitor and evaluate sourcing strategies. Sourcing strategies can include determining from which entity to purchase items that need to be procured. Strategic sourcing can include supply chain management, supplier development, contract negotiation, and outsourcing evaluation.

SUMMARY

The present disclosure involves systems, software, and computer implemented methods for creating line item information from tabular data. One example method includes receiving event data values at a system. Column headers of columns in the event data values are identified. At least one column header is not included in standard line item terms used by the system. Column values of the columns in the event data values are identified. The identified column headers and the identified column values are processed using one or more models to map each column to a standard line item term used by the system. The processing includes using context determination and content recognition to identify standard line item terms. An event is created in the system, including the creation of line items from the identified column value. Each line item includes standard line item terms mapped to the columns.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

A buyer at an organization may want to procure item(s) for the organization. The buyer may want to find a supplier who can provide the item(s) at a lowest price. Other factors can influence selection of a supplier, such as past interactions, overall reputation, delivery time factors, etc. Strategic sourcing can be a process for trying to find a best supplier for the organization for a set of one or more items that the organization wants to procure. After performing the strategic analysis, a supplier can be selected and awarded a sourcing opportunity.

An input to strategic sourcing can be a sourcing event that includes a list of line item(s) that the organization wants to procure. Line items for a sourcing event can be defined using a user interface that has fixed fields into which values for line items can be added. As another example, a spreadsheet file that includes line items can be provided as an input. Both a fixed-field user interface and a spreadsheet can have a predefined number of predefined fields that are expected to include certain types of data. These types of input formats generally do not allow for deviations to expected inputs. Although sourcing events are described, other types of events can be used.

In some implementations, a buyer can download a spreadsheet template from a sourcing system, or another type of system, which has fixed column names for different types of line item fields, such as a line item number, a line item description, a lead time, and various price fields, for example. The template may generally include term and field names used by the sourcing system. These field names may not match or be completely familiar to terms and field names used by the buyer. This unfamiliarity can put constraints on a buyer and other people in the organization, such as other sourcing managers in the organization. For instance, in the organization, rather than "lead time," the buyer and sourcing managers may be familiar with "delivery time" instead. Other types of information can have different terminology between a buyer's organization and a sourcing system. Having to use and interpret unfamiliar, rather than familiar terms can be inconvenient and inefficient for buyers, and can lead to user dissatisfaction with the sourcing system.

To provide more flexibility and convenience for buyers, a buyer can generate line item input data using any form that is convenient and familiar to the buyer. For example, the buyer can create one or more spreadsheets that include line item information. Line item information for a buyer can be defined in one table, multiple tables, within one sheet, across sheets, etc. For instance, suppose a buyer needs to buy items for internal use within an organization, such as furniture items and office supplies. A first sheet or table can list information describing desired furniture items, such as furniture item descriptions, furniture item dimensions, etc. A second sheet can list information describing desired office supplies, such as supply characteristics, such as color, brand, etc. The item descriptions for furniture and office supplies can differ, since different fields can describe the different types of items. The buyer can provide data describing these items using field/column names that are meaningful to the buyer, rather than trying to put item descriptions into hard-coded fields from a template that was not developed by the buyer's organization. The buyer can provide the information in format(s) that the buyer needs, rather than downloading and using an unfamiliar template or rigid user interface.

The sourcing system can accept the free form data as input and determine and predict various meanings from the inputted data. For example, the sourcing system can determine a context of each item in the free form data, to determine a line item identifier, a line item description, and a set of term(s) for each line item. Terms can be, for example, price, color, width, height, etc. The sourcing system can infer/determine a data type for each term. For instance, a data type of currency can be inferred for a price term and a unit-of-measure data type can be inferred for height and width terms. Data types can be determined based on keyword/symbol identification, as described below. Additionally or alternatively, data types can be determined based on historical data use or determinations. For instance, if a customer has used a term named "total value" as a currency data type in the past, the system can predict that a term named "value" is also of type currency. Data types can include higher level types that are higher level than primitive data types such as integer. Higher level data types can include currency, measurement dimensions, etc. The sourcing system can determine that certain items have a certain type of currency, such as USD (United States Dollars), Euros, etc. The sourcing system can convert different types of currencies to a common currency for comparison purposes, for example.

The sourcing system can recognize synonyms between terms. If an input has a term that is a synonym of a standard, global term used by the sourcing system, the synonymous term can be linked to the standard term, rather than creating a new term in the sourcing system. For instance, a common term may be "plant," and synonymous input terms such as "ship-to address" may be mapped to the standard "plant" term. Matching to common, global terms can save memory, thereby increasing performance, and enable standard processing of terms, for comparisons, decision making etc. Global terms can be included in a corpus. The corpus can be built based on documentation and other data about multiple procurement products, so as to include terms commonly used in procurement systems.

When translating terms, match scores can be generated for each of a set of candidate global terms that may match an input term. A closest match (e.g., a candidate global term having a highest match score) can be selected as a synonym for the input term, and the input term can be mapped to the selected global term. If no match score is greater than a threshold, then a new, custom term can be created for the customer based on the input term.

The model-based approach can provide various advantages. For example, mapping based on column headers be performed in an unsupervised fashion, with no training required. Models can identify new terms recently created by buyers (or terms first seen by the sourcing system). Standard line item terms can be inferred based on both column headers as well as column content. Heterogeneous columns can be mapped to different target columns. Approaches can be language agnostic.

Figure 1:
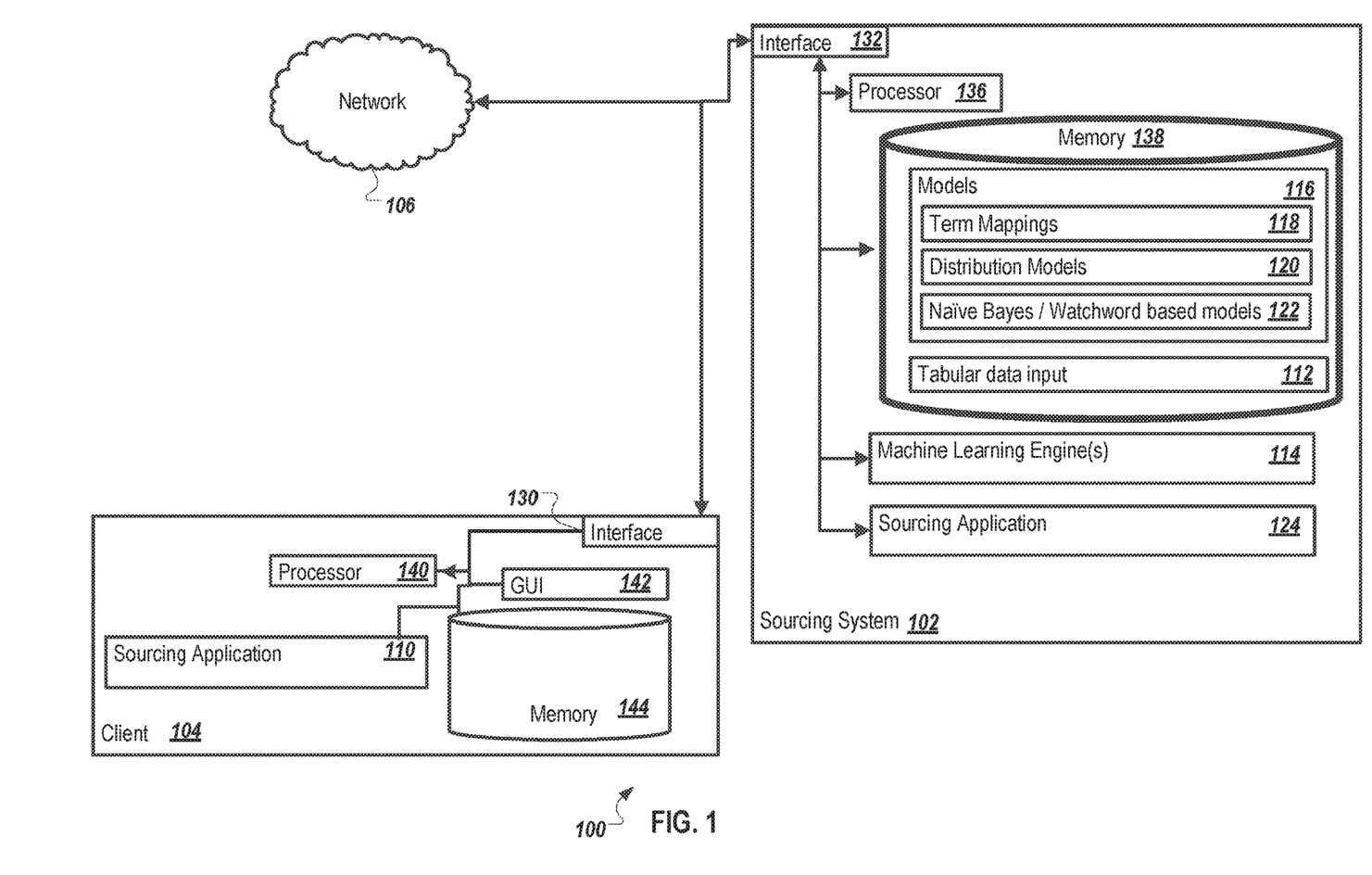
FIG. 1 is a block diagram illustrating an example system for creating line item information from tabular data.

FIG. 1 is a block diagram illustrating an example system 100 for creating line item information from tabular data. Specifically, the illustrated system 100 includes or is communicably coupled with a sourcing system 102, a client device 104, and a network 106. Although shown separately, in some implementations, functionality of two or more systems or servers may be provided by a single system or server. In some implementations, the functionality of one illustrated system or server may be provided by multiple systems or servers.

A user can use a sourcing application 110 executing on or accessed by the client device 104 to create a sourcing event. A sourcing event can be an auction request, a request for information (RFI), a request for a proposal, or a request for quotation (which can all generically be referred to as RFX (e.g., request for "X"). The sourcing event can be sent by the sourcing application 110 to the sourcing system 102.

The sourcing event can be created using a user interface of the sourcing application 110. As another example, a fixed-field data file (e.g., a spreadsheet) can be uploaded to the sourcing system 102 by the sourcing application 110. The user interface and the fixed-field data file can have predefined, fixed fields. The predefined, fixed fields can result in a minimal input schema that a buyer may use to create sourcing events and associated line items. The buyer may prefer to use other types of fields, in formats other than offered, for example, by user interface fields or a template-based fixed-field data file. The fixed formats may include fixed terminologies, grammar, and data types, which may not ideally match a buyer's needs. For example, a spreadsheet template may include headers that are not completely familiar to the buyer, due to terminology in the headers not matching terminology used by the buyer's organization. Fixed-field approaches can suffer from challenges posed from not having a way to map a buyer's differing terminology with predefined terms. The sourcing system 102 may be configured to interpret data entered in certain fixed fields or columns in certain predefined ways, which may be limiting to buyers who want to enter or define data in different ways.

To create a more flexible way for buyers to create sourcing events, the sourcing application 110 can be configured to allow a user to upload input data 112 to the sourcing system 102. The input data 112 can be "free-form" in the sense that multiple types of tabular data can be supported. The sourcing system 110 can interpret the input data 112 and automatically create a sourcing event and associated line items. The input data 112 can be spreadsheet formats that a customer normally uses in a course of business, for example. The buyer's spreadsheet formats can differ from templates previously provided by the sourcing system 102, for example. The spreadsheet formats can have various ordering and combinations of columns. Input data 112 can also be other data, including tabular formats provided using electronic mail, electronic messaging, or other formats.

The tabular input data 112 can be processed by one or more machine learning engines 114. For example, column headers and column values in the input data 112 can be identified and used by the machine learning engines 114. The machine learning engines 114 can use one or more models 116 to map each column to a standard line item term used by the sourcing system 102. For example, the models 116 can include mappings 118 of candidate terms to standard line item terms. The candidate line item terms may have been identified from a corpus of terms generated from documentation for the sourcing system 102 and for the sourcing systems. Column names in the tabular input data 112 (possibly after preprocessing) can be mapped to candidate terms, for example. As another example, using the models 116 can include using generative distributed model(s) 120 to infer standard line item terms from numerical column values. As yet another example, using the models 116 can include using naïve Bayes model(s) 122 to identify standard line items term from textual column values.

Term translations can be presented to the buyer in the sourcing application 110, and the buyer can confirm or reject respective translations. If the buyer rejects a translation, the buyer can select a proper global term. For instance, the buyer can select a term from a set of presented candidate standard terms (e.g., candidate standard terms can be other terms that had lesser match scores but still match scores sufficient enough to be a candidate term). User confirmations, rejections, and alternative selections can be used as feedback for training and reconfiguring the models 116, to improve future predictions.

In some implementations, the models 116 include both common models common to multiple customers and customer-specific models specific to a respective customer. User feedback can be applied to both a common model and a customer-specific model. For instance, if a first customer confirms a translation of an input term to a standard term, and a second customer has an input file that includes the same input term, a model can be more likely to translate the input term from the second customer to the same standard term as suggested to the first customer. In some implementations, changes to a global model occur after repeated types of translations are confirmed/rejected by multiple customers. For instance, customer-specific feedback can be applied to customer-specific models, but if, for example, ten (or another predefined threshold of) customers provide a same type of feedback, that feedback can be applied to the global model. In some instances, the customer-specific models may be extensions or variations to a corresponding one or more common models.

Once a user confirms term translations, a sourcing event, with line items having the identified standard item terms can be created in the sourcing system by a sourcing application 124.

As used in the present disclosure, the term "computer" is intended to encompass any suitable processing device. For example, although FIG. 1 illustrates a single sourcing system 102, and a single client device 104, the system 100 can be implemented using a single, stand-alone computing device, two or more sourcing systems 102, or two or more client devices 104. Indeed, the sourcing system 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the sourcing system 102 and the client device 104 may be adapted to execute any operating system, including Linux, UNIX, Windows, Mac OS®, Java™, Android™, iOS or any other suitable operating system. According to one implementation, the sourcing system 102 may also include or be communicably coupled with an e-mail server, a Web server, a caching server, a streaming data server, and/or other suitable server.

Interfaces 130 and 132 are used by the client device 104 and the sourcing system 102, respectively, for communicating with other systems in a distributed environment— including within the system 100—connected to the network 106. Generally, the interfaces 130 and 132 each comprise logic encoded in software and/or hardware in a suitable combination and operable to communicate with the network 106. More specifically, the interfaces 130 and 132 may each comprise software supporting one or more communication protocols associated with communications such that the network 106 or interface's hardware is operable to communicate physical signals within and outside of the illustrated system 100.

The sourcing system 102 includes one or more processors 136. Each processor 136 may be a central processing unit (CPU), a blade, an application specific integrated circuit (ASIC), a field-programmable gate array (FPGA), or another suitable component. Generally, each processor 136 executes instructions and manipulates data to perform the operations of the sourcing system 102. Specifically, each processor 136 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The sourcing system 102 includes memory 138. In some implementations, the sourcing system 102 includes multiple memories. The memory 138 may include any type of memory or database module and may take the form of volatile and/or non-volatile memory including, without limitation, magnetic media, optical media, random access memory (RAM), read-only memory (ROM), removable media, or any other suitable local or remote memory component. The memory 138 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the sourcing system 102.

The client device 104 may generally be any computing device operable to connect to or communicate with the sourcing system 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the sourcing application 110. A client application is any type of application that allows the client device 104 to request and view content on the client device 104. In some implementations, a client application can use parameters, metadata, and other information received at launch to access a particular set of data from the sourcing system 102. In some instances, a client application may be an agent or client-side version of the one or more enterprise applications running on an enterprise server (not shown).

The client device 104 further includes one or more processors 140. Each processor 140 included in the client device 104 may be a central processing unit (CPU), an application specific integrated circuit (ASIC), a field-programmable gate array (FPGA), or another suitable component. Generally, each processor 140 included in the client device 104 executes instructions and manipulates data to perform the operations of the client device 104. Specifically, each processor 140 included in the client device 104 executes the functionality required to send requests to the sourcing system 102 and to receive and process responses from the sourcing system 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the sourcing system 102, or the client device 104 itself, including digital data, visual information, or a GUI 142.

The GUI 142 of the client device 104 interfaces with at least a portion of the system 100 for any suitable purpose, including generating a visual representation of the sourcing application 110. In particular, the GUI 142 may be used to view and navigate various Web pages, or other user interfaces. Generally, the GUI 142 provides the user with an efficient and user-friendly presentation of business data provided by or communicated within the system. The GUI 142 may comprise a plurality of customizable frames or views having interactive fields, pull-down lists, and buttons operated by the user. The GUI 142 contemplates any suitable graphical user interface, such as a combination of a generic web browser, intelligent engine, and command line interface (CLI) that processes information and efficiently presents the results to the user visually.

Memory 144 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 144 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the sourcing system 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

Figure 2:
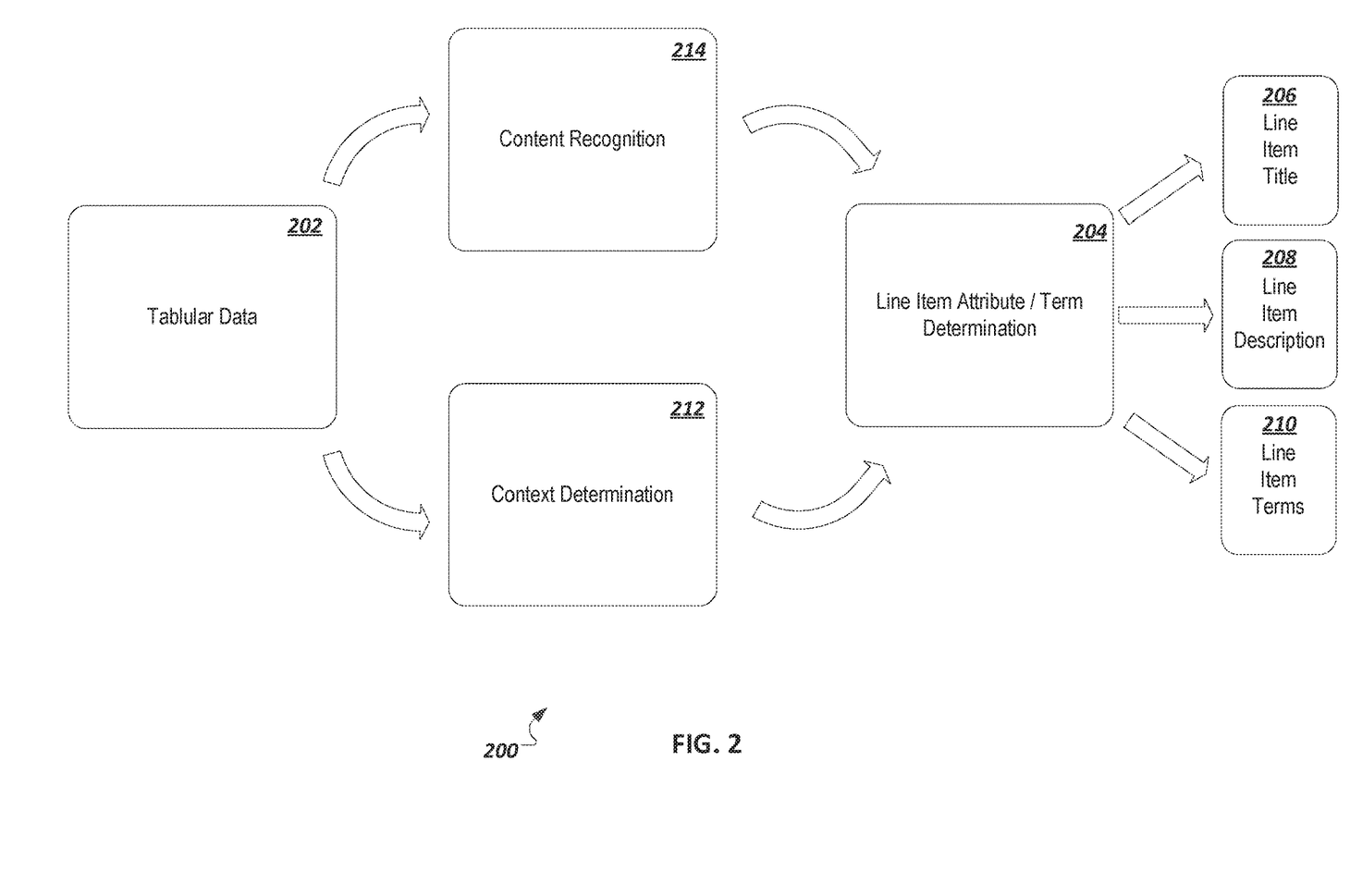
FIG. 2 illustrates an example system for determining line item information from tabular data.

FIG. 2 illustrates an example system 200 for determining line item information from tabular data. A buyer can provide a tabular data input 202 (e.g., spreadsheet(s), table(s), etc.) to a sourcing system. The sourcing system can determine line item information 204, including line item attributes and terms for line item(s), based on the tabular data input 202. For instance, line item elements created from the tabular input data 202 can include a line item title 206, a line item description 208, and line item terms 210. Line item terms 210 can include, for example, a price term representing an initial price at which bidding should start (e.g., $10, 10USD, etc.). Other terms can include a number of units to be ordered, with example input data being "10 kg," "10 units," and "30 pounds." As another example, a "plant" term is an address to where ordered items are to be shipped.

A ship-to address type term can be specified in various ways in the tabular data input 202. For example, automotive companies may use a term "ShipToAddress" while retail companies may use a term "StoreAddress." As another example, even inside a same organization, an administrator may use the term "DeliveryAddress" but other departments may use some other term. The sourcing system can map address-type terms, irrespective of exact words used to describe an address, to a common term called "plant", for example. Mapping to a common term can be done to enable optimizations or awarding decisions, or to enable sending data to external systems in a consistent format.

The sourcing system can perform one or both of context determination 212 and content recognition 214 when creating line item elements from the tabular input data 202. Context determination 212 can include identifying a term based on a column name or heading in the tabular data input 202. A spreadsheet or a free-form table can have column names or headers, for example. Content recognition 214 can be performed when some or all input data has no headers or can be performed as an augmentation to context determination. Content recognition 214 can include examining column contents of the tabular data input 202 to infer a mapping of input to term(s). As described in more detail below, content recognition 214 can include performing a number of algorithms or approaches to determine a best term associated with a particular column of input.

As an example, a column that includes address information may not have a header or may have a header which does not directly indicate an address. For example, a header may be "post". "Post" may be a term that is not currently in a corpus as relating to a ship-to address, for example. A content recognition engine can determine that column contents include data that matches street/city/country, country/city, or another type of address pattern. The content recognition engine can determine an address data type based on the column contents, and based on past data, derive that the column data corresponds to a known global "plant" term.

In some implementations, candidate terms are identified based on both content recognition 214 and context determination 212. Individual match scores for candidate terms can be generated based on both content recognition 214 and context determination 212, for example. An aggregate score can be generated for each candidate term based on the individual match scores for the term from content recognition 214 and context determination 212. A candidate term that has a best aggregate score can be selected as corresponding to the input column.

Figure 3:
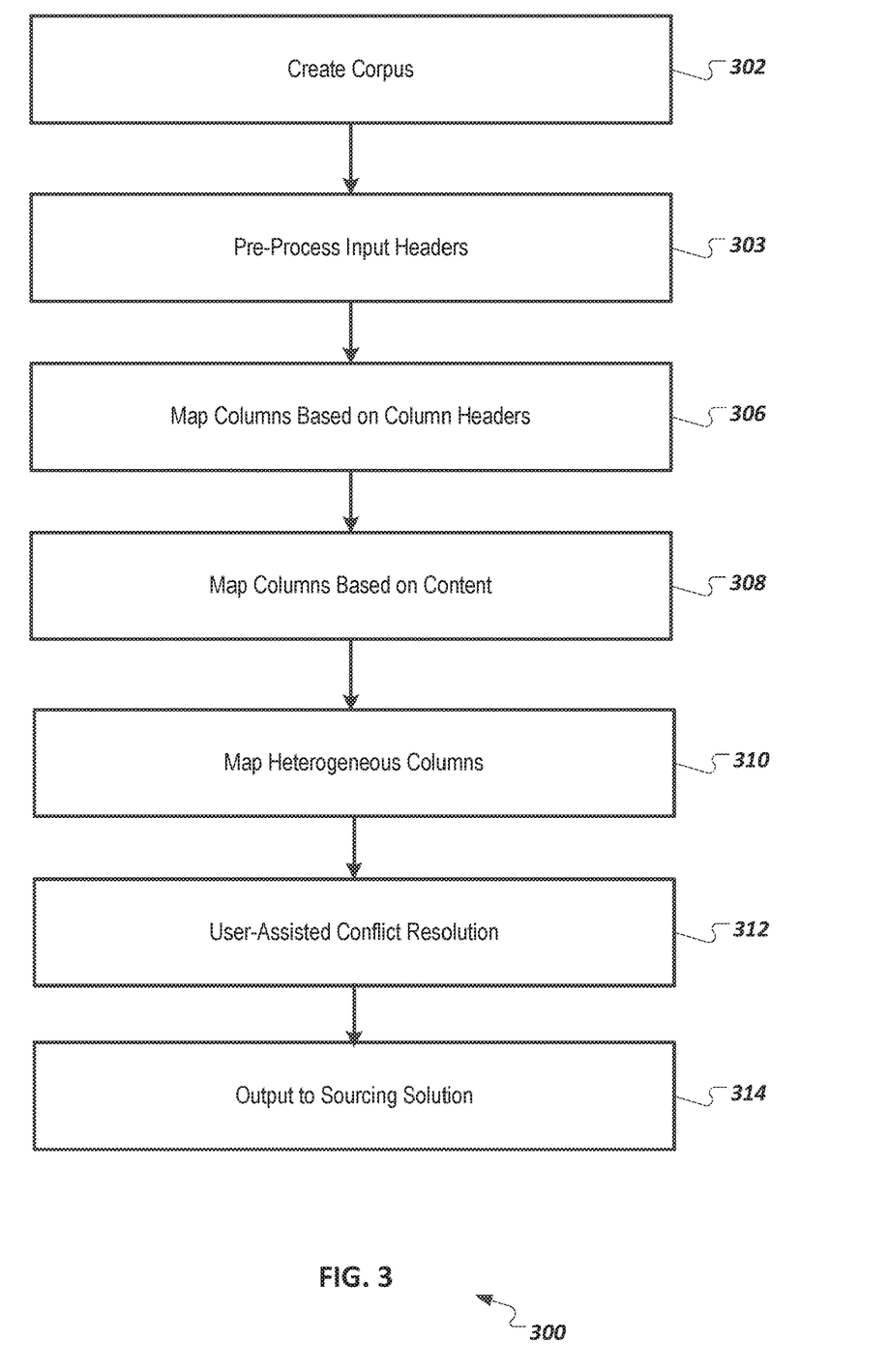
FIG. 3 illustrates a flowchart of an example pipeline of processing for creating line item information from tabular input data.

FIG. 3 illustrates a flowchart 300 of an example pipeline of processing for creating line item information from tabular input data. In a first stage 302, a corpus of terms is created. The corpus can be created using a knowledge base of procurement terms, product documentation of the sourcing system, product documentation of other sourcing or procurement systems (e.g., competitor systems), etc. Frequently co-occurring (e.g., adjacent) terms can be grouped into a single term. For instance, a corpus generation engine can determine that "estimated" and "lead" frequently occur together in "estimated lead" phrases in various types of documentation. The two terms can be joined into a single "estimated_lead" term.

In a second stage 304, input headers are pre-processed. For example, the input may be one or more spreadsheets and/or one or more tables of tabular data. The spreadsheets or tables can have headers (e.g., column headers). Information in the headers can be processed. For example, the headers can be converted to a common case (e.g., single-case, upper-case).

Figure 4A:
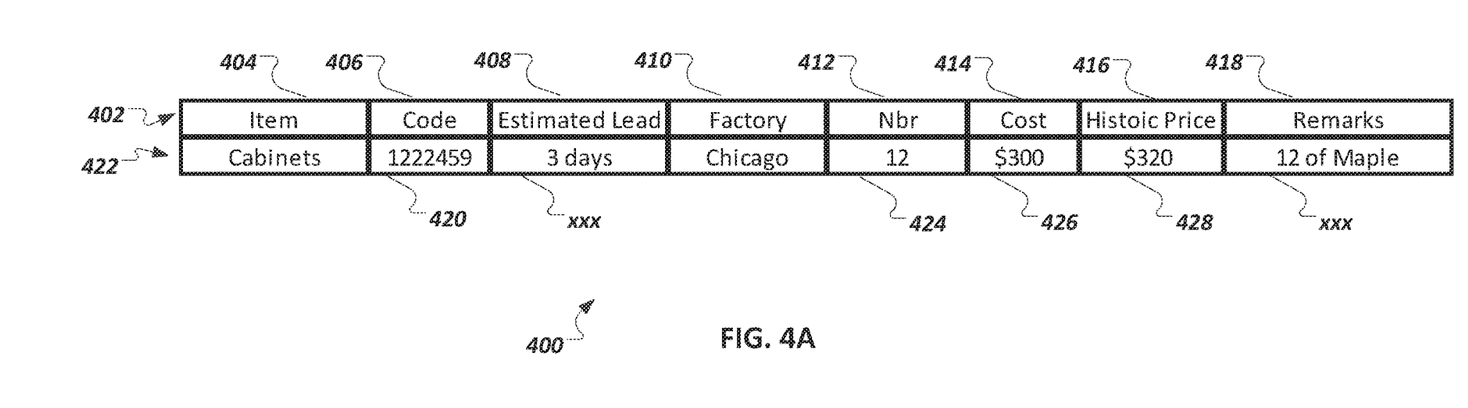
FIG. 4A illustrates an example input table.

FIG. 4A illustrates an example input table 400. The input table 400 includes a header row 402 that includes an "Item" header 404, a "Code" header 406, an "Estimated Lead" header 408, a "Factory" header 410, a "Nbr" header 412, a "Cost" header 414, a "Histoic Price" header 416, and a "Remarks" header 418. During input header preprocessing, each of the headers 404-418 can be converted to lower case. Spelling errors can be corrected in the input headers, using an edit-distance algorithm, for example. For instance, "Histoic" in the "Histoic Price" header 416 can be corrected to "Historic."

Multiple-word phrases in input headers can be formed into a single phrase term. For example, the "Estimated Lead" header 408, after lower case and phrase processing, can be "estimated_lead". As another example, the "Histoic Price" header 416, after lower case, spell-check, and phrase processing can be "historic_price".

Referring again to FIG. 3, in a third stage 306, column headers are mapped to global terms. The third stage 306 can correspond to the context determination 212 described above with respect to FIG. 2. For instance, after input headers are pre-processed, the pre-processed headers can be compared to candidate terms in a global corpus. In some implementations, candidate terms for a particular input are global terms that have been created for a realm (e.g., tenant) associated with the input (or the provider of the input).

In some implementations, for every pre-processed input column header, a top N nearest words can be identified from the corpus and an intersection of the top N nearest words with global terms can be identified to pick a top match.

Figure 4B:
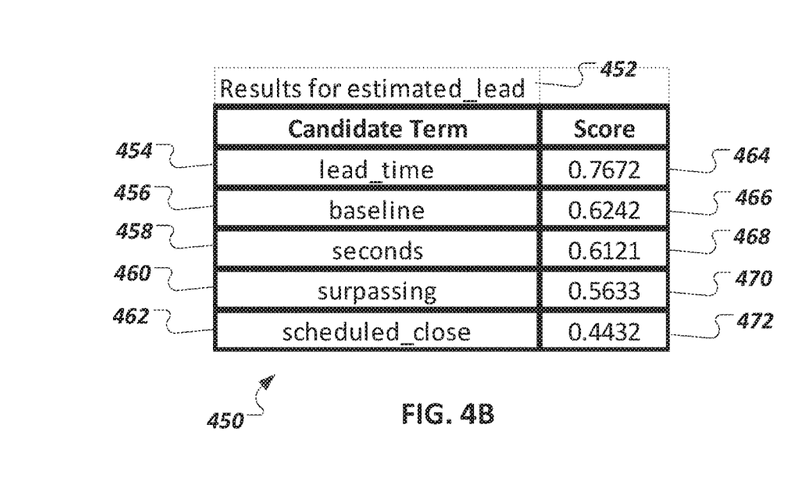
FIG. 4B is a table that illustrates match scores for candidate terms for a column header.

FIG. 4B is a table 450 that illustrates match scores for candidate terms for a column header. The "Estimated Lead" header 408 can be preprocessed to an input term of "estimated_lead" 452, as described above. The input term "estimated_lead" can be matched to candidate global terms of "lead time" 454, "baseline" 456, "seconds" 458, "surpassing" 460, and "scheduled_close" 462. Respective match scores 464, 466, 468, 470, and 472 for the candidate global terms 454-462 have been determined. Match scores for other candidate global terms can be computed—the table 452 may list candidate global terms that have highest match scores, for example. The candidate global term "lead time" 454 may be selected for mapping to the input term "estimated_lead" 452, based on having a highest match score.

A mapping of "estimated_lead" to "lead time" can be stored in a model, so that if "estimated_lead" appears in subsequent input(s) from the customer, "estimated_lead" can be automatically mapped to "lead time," with less processing than for the initial determination of the mapping. As mentioned above, a global model for all customers can be updated, in some implementations, or after a certain number of occurrences of "estimated_lead" have been detected, for the customer or for customers in general.

Other examples of term mapping based on column headers can include the "Factory" header 410 being mapped to a "plant" global term, the "Histoic Price" header 416 being mapped to a "historic.price" global term (after header pre-processing), the "Cost" header 414 being mapped to a "cost" global term (after header preprocessing).

Referring again to FIG. 3, in a fourth stage 308, columns are mapped based on content. The fourth stage 308 can correspond to the content recognition 214 described above with respect to FIG. 2.

Numerical columns (e.g., columns including numeric values in rows other than a header row) can be processed using a generative model. For each numerical column, the generative model can learn distribution parameters for historical data (e.g., historical data for columns in previously seen tables that are similar to the current column's data, or historical data for columns that have been mapped to a global term that matches, e.g., a column header of the current column). The distribution model can be used to infer a global term for the current column's data.

For instance, for the example input table 400, the "Code" header 406 is a header for a code numerical column (e.g., a code value 420 in a value row 422 is all numeric). Other value rows (other than illustrated) can be included in the example input table 400. Distribution models for historical data can be compared to values in the code column, and a distribution model most similar to the values in the code column can be identified. For instance, the values in the code column may be most similar to a distribution model for a "spsc_code" (e.g., Standard Products and Services code) term. Accordingly, the code column can be mapped to the "spsc_code" term. Additionally, an input term "code", corresponding to the "Code" header 406, can be mapped to the "spsc_code" term, so that future columns of input with a "Code" header can be mapped to the "spsc_code" term more readily.

As another example, the "Nbr" header 412 is a header for a numerical column (e.g., including a numerical value 424). Distribution models for historical data can be compared to values in the numerical column, and a distribution model most similar to the values in the numerical column can be identified. For instance, the values in the numerical column may be most similar to a distribution model for a "quantity" term. Additionally, an input term "Nbr" corresponding to the "Nbr" header 412, can be mapped to the "quantity" term, so that future input terms of "Nbr" can be mapped to the "quantity" term. "Nbr" may have not initially been included in the corpus or in a model, but can be added to the model, mapped to the "quantity" term, based on the distribution model analysis.

Textual columns can be processed using a Naïve Bayes/ watchword based model that is trained on historical data. The model can be used to classify the current column's data to a global term, based on the column data values. Using a watchword-based model can include detection of predefined keyword(s) or symbols, and classifying column data based on the keyword/symbol identification. For example, detection of "USD" or "$" can result in determination of a term of type currency. Determination of a term type of currency can add weight to candidate global terms of type currency, as part of overall term determination, for example. As another example, identification of a "kg" watchword can result in determination of a unit of measure term for a column. For instance, column values in columns associated with the "Cost" header 414 and the "Histoic Price" header 416 can be identified as currency columns, based on watchword identification of "$" tokens in the column data (e.g., in values 426 and 428).

Alphanumeric columns can be processed by splitting the alphanumeric content into numerical and non-numerical portions, with numerical portions being processed as described for numerical columns and non-numeric portions being processed as described for textual columns. Information obtained by respective numeric or textual processing can be used to determine a term and/or a higher-level datatype for the alphanumeric column. For instance, a column value of "$10" may be split into "$" and "10"

tokens, with the "$" token being processed by the textual column processing and the "10" being processed by the numerical column processing. The processing of the "$" token can result in identification of the "$" token as a watchword that identifies the column data as a currency data type. Processing the "10" token (and other numerical values in the column) can result in identification of a particular global term of type currency, such as "price" or "extended_price") (e.g., based on historical distributions of values).

Other types of content parsing can be performed. For example, a list of strings that is encountered early in the parsing could be identified as a "description" attribute for a line item.

In a fifth stage 310, heterogeneous columns are mapped. Certain columns such as generic "additional remarks", "comments", "additional information," can have been determined to historically include different types of data (e.g., numeric, textual, alphanumeric). Heterogeneous column headers (e.g., "additional remarks", "comments", "additional information") can be identified. For a current input, if a heterogeneous column is identified in the input, the data in the column can be evaluated to determine whether the current data is numeric, alphanumeric, or textual, with corresponding processing (described above) being performed.

In a sixth stage 312, user-assisted input is used for conflict resolution. If multiple models are used for a column with each model resulting in a different term, the different terms can be presented to a user, and a user can select a correct term. A mapping of a column header and/or column values to the selected term can be added to the model(s) to support continuous learning and model improvement. As another example, model(s) do not identify a term, or identify a term with less than a certain confidence value, a user can create a custom mapping, with the custom mapping being fed back into the model(s) for future resolution.

In a seventh stage 314, model output(s) are provided to the sourcing system for creation of a sourcing event and associated line items. For example, line items can be created from the column values, with each line item including standard line item terms that have been mapped to the columns by the models.

Figure 5:
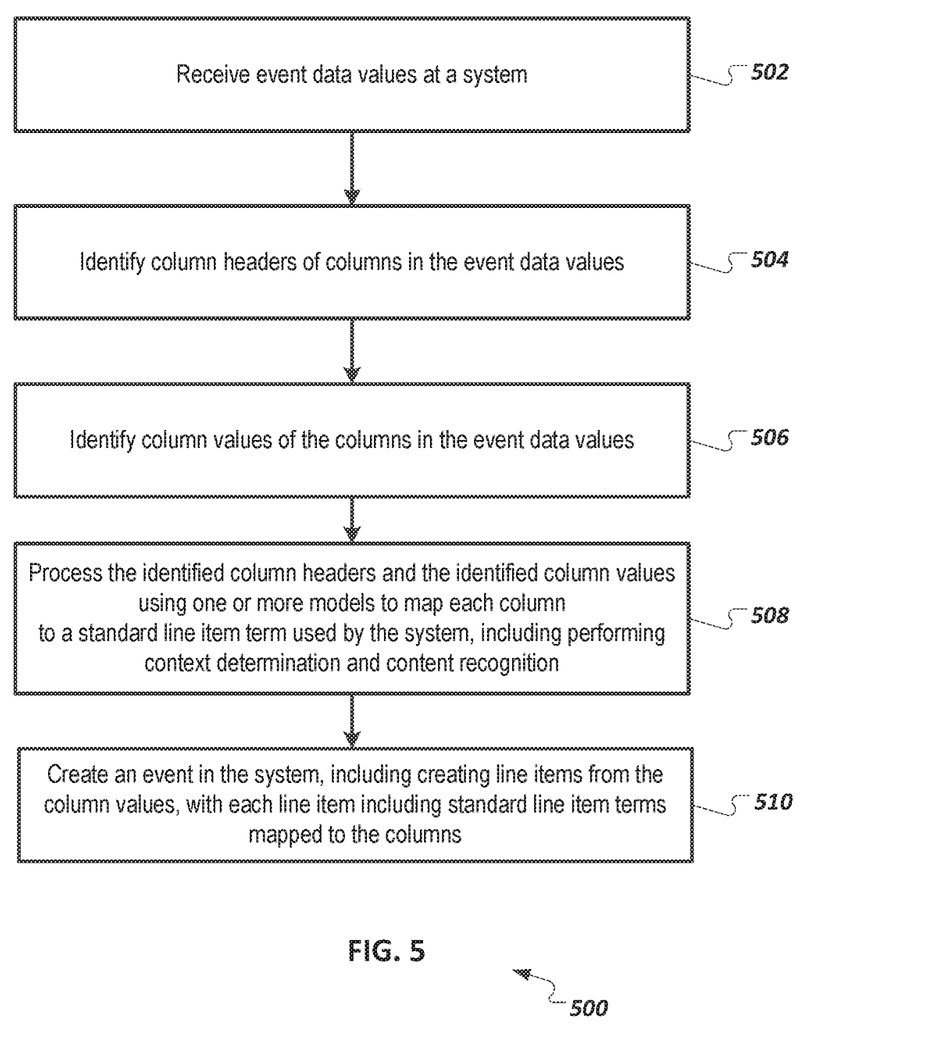
FIG. 5 is a flowchart of an example method for creating line item information from tabular data.

FIG. 5 is a flowchart of an example method 500 for creating line item information from tabular data. It will be understood that method 500 and related methods may be performed, for example, by any suitable system, environment, software, and hardware, or a combination of systems, environments, software, and hardware, as appropriate. For example, one or more of a client, a server, or other computing device can be used to execute method 500 and related methods and obtain any data from the memory of a client, the server, or the other computing device. In some implementations, the method 500 and related methods are executed by one or more components of the system 100 described above with respect to FIG. 1. For example, the method 500 and related methods can be executed by the sourcing system 102 of FIG. 1 or another type of system.

At 502, event data values are received at a system. The event data values can be sourcing event information from a sourcing system or event data values from another type of system.

At 504, column headers of columns in the event data values are identified. At least one column header is not included in standard line item terms used by the system.

At 506, column values of the columns in the event data values are identified.

At 508, the identified column headers and the identified column values are processed using one or more models to map each column to a standard line item term used by the system. The processing can include using context determination and content recognition to identify standard line item terms. Context determination can include identifying a standard line item term based on a column name or heading of a column in the event data values. Content recognition can include examining column contents of the tabular data input to infer a mapping of input to term(s).

The one or more models can include mappings of candidate terms to the standard line item terms. The candidate terms can be included in a corpus. The corpus can include terms identified from product documentation of the sourcing system, documentation of other sourcing systems, or other knowledge bases. Using one or more models can include using a generative distributed model to infer a standard line item term from numerical column values. Using one or more models can include using a naïve Bayes model to identify a standard line item term from textual column values.

The column headers can be preprocessed before being processed using the one or more models. Preprocessing the column headers can include case standardization, spelling error correction, and phrase processing.

At 510, an event is created in the system. The event can be a sourcing event or another type of event. Line items can be created from the column values, with each line item including standard line item terms that were mapped to the columns.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method comprising:
   receiving, at a system, event data values;
   identifying column headers of columns in the event data values, wherein at least one column header is not included in standard line item terms used by the system;
   identifying column values of the columns in the event data values;
   processing the identified column values using one or more content recognition models to generate a content match score for each pairing of a given column and a candidate standard line item term used by the system;
   processing the identified column headers using one or more context recognition models to generate a context match score for each pairing of a given column header and candidate standard line item term;

creating an aggregate match score for each pairing of a column and candidate standard line item term based on the content match score for the pairing of the column and candidate standard line item term and the context match score for the pairing of a corresponding column header and candidate standard line item term;

determining a selected standard line item term for each column by identifying a candidate standard line item term paired with the column that has a highest aggregate match score; and creating an event in the system, including creating line items from the identified column values, wherein each line item includes respective selected standard line item terms that were selected for respective columns.

2. The method of claim 1, wherein using one or more content recognition models includes using a generative distributed model to infer a standard line item term from numerical column values.

3. The method of claim 1, wherein using one or more content recognition models includes using a naïve Bayes model to identify a standard line item term from textual column values.

4. The method of claim 1, wherein using one or more context recognition models includes identifying a standard line item term based on a column name or heading of a column in the event data values.

5. The method of claim 1, wherein the column headers are preprocessed before being processed using the one or more context recognition models.

6. The method of claim 5, wherein preprocessing includes case standardization, spelling error correction, and phrase processing.

7. The method of claim 1, wherein the one or more context recognition models and the one or more content recognition models include mappings of candidate terms to the standard line item terms.

8. The method of claim 7, wherein the candidate terms are included in a corpus.

9. The method of claim 8, wherein the corpus includes terms identified from product documentation of the system or product documentation of other systems.

10. A system comprising:
one or more computers; and
a computer-readable medium coupled to the one or more computers having instructions stored thereon which, when executed by the one or more computers, cause the one or more computers to perform operations comprising:
receiving, at the system, event data values;
identifying column headers of columns in the event data values, wherein at least one column header is not included in standard line item terms used by the system;
identifying column values of the columns in the event data values;
processing the identified column values using one or more content recognition models to generate a content match score for each pairing of a given column and a candidate standard line item term used by the system;
processing the identified column headers using one or more context recognition models to generate a context match score for each pairing of a given column header and candidate standard line item term;
creating an aggregate match score for each pairing of a column and candidate standard line item term based on the content match score for the pairing of the column and candidate standard line item term and the context match score for the pairing of a corresponding column header and candidate standard line item term;
determining a selected standard line item term for each column by identifying a candidate standard line item term paired with the column that has a highest aggregate match score; and
creating an event in the system, including creating line items from the identified column values, wherein each line item includes respective selected standard line item terms that were selected for respective columns.

11. The system of claim 10, wherein the column headers are preprocessed before being processed using the one or more context recognition models.

12. The system of claim 10, wherein the one or more context recognition models and the one or more content recognition models include mappings of candidate terms to the standard line item terms.

13. The system of claim 12, wherein the candidate terms are included in a corpus.

14. The system of claim 13, wherein the corpus includes terms identified from product documentation of the system or product documentation of other systems.

15. A computer program product encoded on a non-transitory storage medium, the product comprising non-transitory, computer readable instructions for causing one or more processors to perform operations comprising:
receiving, at a system, event data values;
identifying column headers of columns in the event data values, wherein at least one column header is not included in standard line item terms used by the system;
identifying column values of the columns in the event data values;
processing the identified column values using one or more content recognition models to generate a content match score for each pairing of a given column and a candidate standard line item term used by the system;
processing the identified column headers using one or more context recognition models to generate a context match score for each pairing of a given column header and candidate standard line item term;
creating an aggregate match score for each pairing of a column and candidate standard line item term based on the content match score for the pairing of the column and candidate standard line item term and the context match score for the pairing of a corresponding column header and candidate standard line item term;
determining a selected standard line item term for each column by identifying a candidate standard line item term paired with the column that has a highest aggregate match score; and
creating an event in the system, including creating line items from the identified column values, wherein each line item includes respective selected standard line item terms that were selected for respective columns.

16. The computer program product of claim 15, wherein the column headers are preprocessed before being processed using the one or more context recognition models.

17. The computer program product of claim 16, wherein preprocessing includes case standardization, spelling error correction, and phrase processing.

18. The computer program product of claim 15, wherein the one or more context recognition models and the one or more content recognition models include mappings of candidate terms to the standard line item terms.

19. The computer program product of claim 18, wherein the candidate terms are included in a corpus.

20. The computer program product of claim 19, wherein the corpus includes terms identified from product documentation of the system or product documentation of other systems.

* * * * *